United States Patent [19]
Shaikh et al.

[11] Patent Number: 5,627,255
[45] Date of Patent: May 6, 1997

[54] POLY(ARYLESTER-CARBONATE)S AND A PROCESS FOR THE PREPARATION OF POLY(ARYLESTER-CARBONATE)S

[75] Inventors: Abbas-Alli G. Shaikh, District Solapur; Swaminathan Sivaram, Pune, both of India

[73] Assignee: Council of Scientific & Industrial Research, New Delhi, India

[21] Appl. No.: 220,182

[22] Filed: Mar. 30, 1994

[51] Int. Cl.⁶ .............................. C08G 64/00; C08G 63/02
[52] U.S. Cl. .................. 528/196; 528/176; 528/193; 528/194; 528/198; 528/199
[58] Field of Search ........................ 528/176, 193, 528/194, 196, 198, 199

[56] References Cited

FOREIGN PATENT DOCUMENTS 8098228 of 1980 Japan.
01247420 of 1989 Japan.

*Primary Examiner*—Terressa M. Mosley
*Attorney, Agent, or Firm*—Michael D. Bednarek; Kilpatrick & Cody, L.L.P.

[57] ABSTRACT

Novel poly(arylester-carbonate)s of the formula

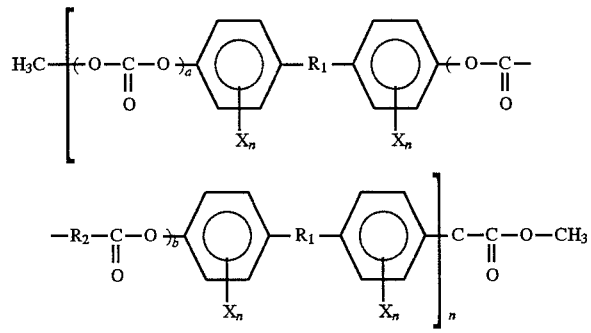

are disclosed, as well a process for preparing such poly(arylester-carbonate)s.

5 Claims, 1 Drawing Sheet a = 0.33·moles
b = 0.67·moles

POLY(ARYLESTER-CARBONATE)S AND A PROCESS FOR THE PREPARATION OF POLY(ARYLESTER-CARBONATE)S

BACKGROUND OF THE INVENTION

1. Field of the Invention

This invention relates to a poly(arylester-carbonate)s and process for the preparation of poly(arylester-carbonate)s.

The present invention particularly relates to the application of the mono-alkylcarbonate of bisphenols for the synthesis of a variety of poly(arylester-carbonate)s. Poly (arylestercarbonate)s are a class of engineering plastics which are commercially produced by the industry for replacing glass, metals, etc. They find wide application either as such or in blends with other well known polymers such as poly (ethylene terephthalate), poly(butylene terephthalate), etc. The introduction of a carbonate linkage in the matrix of a crystalline polyester has the beneficial effect of improving processability, reducing the glass transition temperature and improving impact strength.

2. Description of Related Art

Poly(arylester-carbonate)s are generally prepared by a melt polycondensation process involving bisphenol-A, aromatic dicarboxylic acid and diphenylcarbonate at 280° C. and 5 mm Hg pressure in presence of a suitable catalyst, [Japan patent 01,247,420 (1989); Japan patent 8098,228 (1980); Eur. pat. Appln. 303, 93 (1989) .

Alternatively, an interfacial polymerization technique can also be used wherein the sodium salt of bisphenol-A is reacted with a mixture of acid chlorides of aromatic dicarboxylic acid and phosgene in two phase medium consisting of water and methylene chloride as solvents and in presence of a phase transfers catalysts (G. S. Kolesnikov et al, Vysokomol. soedin. set. B, 9:49 (1987), Ger. offen. 2,009,49 (1971).

There are many inherent limitations in the currently available processes. In the malt polymerization process three reactants are involved whose relative proportions have to be carefully maintained in order to produce high molecular weight polymers. Furthermore, the process uses diphenyl-carbonate which is very expensive. The interfacial process uses corrosive and toxic phosgene and produces sodium chloride by-product. In addition, organic solvents are used.

SUMMARY OF THE INVENTION

The main object of the present invention is to provide a novel an poly(arylester-carbonate)s of the formula (1) of the drawing accompanying the specification, where, a=0.55 and b=0.67 moles, $R_1$ represents groups such as isopropylidene, methylene, ethylmethylene, isobutylmethyl-methylene, diphenylmethylene, phenylmethylmethylene, hexafluoroisopropylidene, phthalines, phthalimides, N-substituted phthalimides (methyl, phenyl), 1,4 phenylene, 1,4 naphthalene, 2,6 naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester, amide and the like, $R_2$ represents groups such as 1,4 benzene, 1, 3 benzene, 4,4 biphenyl, p-terphenyl, m-terphenyl, 1,4 naphthalene, 2, 6 naphthalene and compounds having the structure as shown in formula (5) wherein Y represents groups such as isopropylidene, methylene, hexa-fluoroisopropylidene, ethylmethylene, isobutylmethylmethylene, diphenylmethylene, phenylmethylmethylene, phthalines, phthalimides, N-substituted phthalimides (phenyl,methyl), dihydroanthracene, indanes, spirobisindanes, thiophenes, azo, dimethyldiphenylsilane, tetraphenylsilane, hydroquinoids, cyclohexane, sulfide, sulfone, sulfoxide, ketone; ester, amide and the like and X represents substituents on aromatic ring which consist of a straight chain of carbon atoms or alkyl group consisting of branching or a phenyl group or a halogen atom and n is an integer from 1 to 4.

The other object of the invention is to provide an improved and simple route to a wide range of poly(arylester-carbonate)s which obviates many of the disadvantages of the hitherto known processes.

DESCRIPTION OF THE PREFERRED EMBODIMENTS

Figure 1:
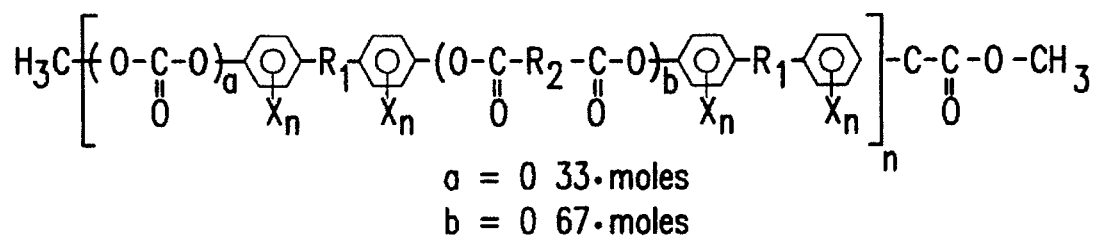
Figure 2:
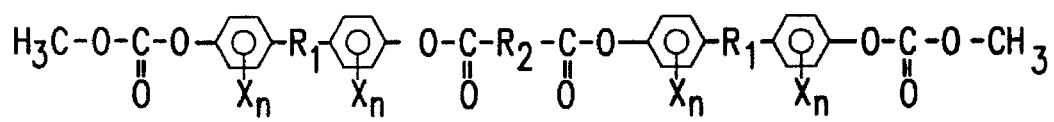
Figure 3:
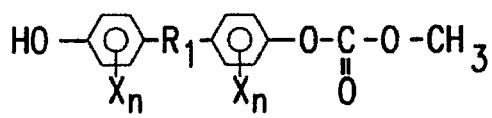
Figure 4:
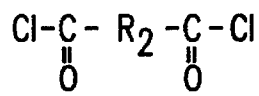
Figure 5:
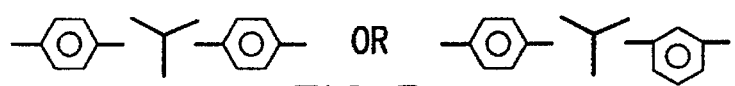
Figure 6:
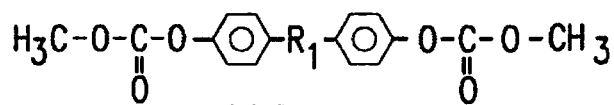
Figure 7:
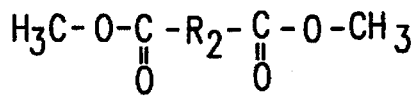

Accordingly, the present invention further provides an improved process for the preparation of poly(arylester-carbonate)s of the formula (1) of the drawing accompanying the specification, where, a=0.33 and b=0.67 moles, $R_1$ represents groups such as isopropylidene, methylene, ethylmethylene, isobutylmethylmethylene, diphenylmethylene, phenylmethylmethylene, hexafluoroisopropylidene, phthalines, phthalimides, N-substituted phthalimides (methyl, phenyl), 1,4 phenylene, 1,4 naphthalene, 2,6 naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester, amide and the like, $R_2$ represents groups such as 1,4 benzene, 1, 3 benzene, 4,4 biphenyl, p-terphenyl, m-terphenyl, 1,4 naphthalene, 2,6 naphthalene and compounds having the structure as shown in formula wherein Y represents groups such as isopropylidene, methylene, hexa-fluoroisopropylidene, ethylmethylene, isobutylmethylmethylene, diphenylmethylene, phenylmethylmethylene, phthalines, phthalimides, N-substituted phthalimides (phenyl,methyl), dihydroanthracene, indanes, spirobisindanes, thiophenes, azo, dimethyldiphenylsilane, tetraphenylsilane, hydroquinoids, cyclohexane, sulfide, sulfone, sulfoxide, ketone, ester and amide and X represents substituents on aromatic ring which consist of a straight chain of 1–6 carbon atoms or alkyl group consisting of branching or a phenyl group or a halogen atom and n is an integer from 1 to 4, which comprises polymerisation of monomer of the formula (2), where $R_1$, $R_2$, X & n have the meaning given above by heating at a temperature in the range of 80° to 350° C., a pressure in the range of 760 mm Hg to 0.1 mm Hg in an inert atmosphere in the presence of a metal organic compound catalyst, for a period in the range of 3 to 7 hours.

The monomer of the formula (2) can be conveniently prepared by reacting mono-methylcarbonate of bisphenols of the formula (3), (prepared according to procedures described in our Indian patent application no.1237/DEL/ 1992) with a variety of diacid chlorides of dicarboxylic acid of the formula (4) wherein $R_1$, $R_2$, X and n have the meaning given above, in an organic solvent in presence of a basic reagent at a temperature of 0° C. The reaction occurs within 45–60 minutes and the yields are quantitative. The basic reagent can be any of the nitrogen derivatives, namely, triethylamine, sec-butylamine, piperidine, pyridine, picoline and N,N'-dimethylaminopyridine The $R_1$ group in formulae 1,2 & 3 can be selected from the following groups=isopropylidene, methylene, ethylmethylene, isobutylmethylmethylene, diphenylmethylene, phenylmethylmethylene, hexafluoroisopropylidene, phthalines, phthalimides, N-substituted phthalimides (methyl, phenyl), 1,4 phenylene, 1,4 naphthalene, 2,6 naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester and amide. Compounds of the formulae 1,2 & 3 may have substituents on aromatic ring wherein X can be a straight chain of 1–6 carbon atoms or alkyl groups consisting of branching or a phenyl group or a halogen atom and n in an integer from 1 to 4.

The $R_2$ group in formulae 1,2 & 4=1,4 benzene, 1,3 benzene, 4,4 biphenyl, p-terphenyl, m-terphenyl, 1,4 naphthalene, 2,6 naphthalene and compounds having the structure as shown in formula (5) wherein Y represents groups=isopropylidene, methylene, hexafluoroisopropylidene, ethylmethylene, isobutylmethylmethylene, diphenylmethylene, phenylmethylmethylene, phthalines, phthalimides, N-substituted phthalimides (phenyl,methyl), dihydroanthracene, indanes, spirobisindanes, thiophenes, azo, dimethyldiphenylsilane, tetraphenylsilane, hydroquinoids, cyclohexane, sulfide, sulfone, sulfoxide, ketone, ester and amide.

The preferred temperature-time-pressure profile is as follows.

| Temp. (0° C.) | Time (min.) | Pressure (mm Hg) |
| --- | --- | --- |
| 100–150–200 | 30–60 | N2 |
| 200 | 60 | 0.1 |
| 250 | 60 | 0.1 |
| 280 | 60 | 0.1 |
| 320 | 30 | 0.1 |

The amount of catalyst employed may be quite low and ranges from $10^{-2}$ to $10^{-5}$ mole per mole of starting material. Typical catalyst concentration is $10^{-2}$ mole per, mole of monomer.

The catalyst can be chosen from amongst the wide variety of metal organic compounds known. Examples are titanium isopropoxide, titanium -n-butoxide and titanium aryloxide. In case of titanium aryloxide the aryl group may have a substituent (Cl, Br, $NO_2$, $OCH_3$, $CH_3$. (o,m,p) or unsubstituted. Derivatives of tin compounds such as di-n-butyltin oxide, di-n-butyltin dicarboxylates, di-n-butyltin diacetate, dibutyltin-dilaurate, di-n-butyltin dimethoxide, tri-n-butyltin hydroxide, n-tetrabutyltin, tinoxalate, tri-n-butyltin halide (Cl, Br), di-n-butyltin dihalide(Cl,Br) and stannoxanes having general formula $(XR_1 R_2)_2$ where $R_1 R_2$=alkyl, aryl, substituted aryl (Cl, Br, —$OCH_3$, $CH_3$, —CN, $NO_2$) (o,m & p) and X=O-alkyl, O-aryl, acetate, phenate, and halogens (Cl, Br).

The preferred catalysts are those based on titanium organic compounds.

The structure of the poly(arylester-carbonate)s of the formula (i) produced having a=0.33 and b=0.67 moles, herein is characterised by two strong carbonyl bands in the infra red spectrum, one due to ester linkage at 1735 cm$^{-1}$ to 1745 cm$^{-1}$ and the other due to the carbonate linkage at 1770 cm$^{-1}$ to 1780 cm$^{-1}$. The inherent viscosity of the polymer is around 0.2–0.67 dL/g. Depending on the nature of $R_1$ and $R_2$ group, the polymers show a range of crystallinities around 30%. The glass transition temperature of poly(arylester-carbonate)s varies from 155°–175° C.

Another aspect of the invention relates to a process for the preparation of Poly(arylester-carbonate)s of the formula (1) of the drawing accompanying this specification where a=0.33 to 0.99 moles and b=0.67 to 0.01 moles, $R_1$ represents groups=isopropylidene, methylene, ethylmethylene, isobutylmethylmethylene, diphenylmethylene, phenylmethylmethylene, hexa-fluoroisopropylidene, phthalines, phthalimides, N-substituted phthalimides (methyl, phenyl), 1,4 phonylens, 1,4 naphthalene, 2,6 naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester and amide. $R_2$ represents groups=1,4 benzene, 1,3 benzene, 4,4 biphenyl, p-terphenyl, m-terphenyl, 1,4 naphthalene, 2,6 naphthalene and compounds having the structure as shown in formula (5) wherein Y represents groups=isopropylidone, methylene, hexa-fluoroisopropylidene, ethylmethylene, isobutylmethylmethylene, diphenylmethylene, phenylmethylmethylone, phthalines, phthalimides, N-substituted phthalimides (phenyl,methyl), dihydroanthracene, indanes, spirobisindanes, thiophones, azo, dimethyldiphenylsilane, tetraphenylsilane, hydroquinoids, cyclohexane, sulfide, sulfone, sulfoxide, ketone, ester and amide and X represents substituents on aromatic ring which consist of a straight chain of 1–6 carbon atoms or alkyl group consisting of branching or a phenyl group or a halogen atom and n is an integer from 1 to 4, which comprises copolymerising the monomer of the formula (2) with bismethylcarbonate of bisphenol-A of the formula (6) where $R_1$, $R_2$ X & n have the meaning given above by heating at a temperature in the range of 150° to 350° C., a pressure in the range of 760 mm Hg to 0.1 mm Hg in an inert atmosphere in the presence of a metal organic compound catalyst. The catalyst can be chosen from amongst the wide variety of metal organic compounds known. Examples are titanium isopropoxide, titanium -n-butoxide and titanium aryloxide. In case of titanium aryloxide the aryl group may have a substituent (Cl, Br, $NO_2$, $OCH_3$, $CH_3$. (o,m,p) or unsubstituted. Derivatives of tin compounds such as di-n-butyltin oxide, di-n-butyltin dicarboxylates, di-n-butyltin diacetate, dibutyltin-dilaurate, di-n-butyltin dimethoxide, tri-n-butyltin hydroxide, n-tetrabutyltin, tinoxalate, tri-n-butyltin halide (Cl, Br), di-n-butyltin dihalide(Cl,Br) and stannoxanes having general formula $(XR_1 R_2)_2$ where $R_1 R_2$=alkyl, aryl, substituted aryl (Cl, Br, —$OCH_3$, $CH_3$, —CN, $NO_2$) (o,m & p) and X=O-alkyl, O-aryl, acetate, phenate, and halogens (Cl, Br). for a period in the range of 3 to 7 hours.

The monomer of the formula (6) can be prepared by reaction of bisphenol bis(chloroformate) with methanol in the presence of pyridine as acid acceptor. (H. Schnell and L. Bottenbruch, Macromol. Chem, 57, 1 (1962).

The relative composition of the poly(arylester-carbonate)s in terms of the carbonate to ester linkage can be varied between 0.33–0.99 moles by adjusting the mole ratios of monomers of the formulae (6) and (2) in the above reaction.

The structure of the poly(arylester-carbonate)s of the formula (1) produced having a=0.33–0.99 moles and b=0.67–0.01 moles, herein is characterised by two carbonyl bands in the infra red spectrum, one weak band due to ester linkage at 1735 cm$^{-1}$ to 1745 cm$^{-1}$ and the other strong band due to the carbonate linkage at 1770 cm$^{-1}$ to 1780 cm$^{-1}$. The inherent viscosity of the polymer is around 0.2–0.37 dL/g. Depending on the nature of $R_1$ and $R_2$ group, the polymers show a range of crystallinities around 30%. The glass transition temperature of poly(arylester-carbonate)s varies from 140°–160° C.

Yet another aspect of the invention relates to a process for the preparation of Poly(arylester-carbonate)s of the formula (1) of the drawing accompanying this specification where a=0.33 to 0.01 moles and b=0.67 to 0.99 moles, $R_1$ represents groups=isopropylidene, methylene, ethylmethylene, isobutylmethylmethylene, diphenylmethylene, phenylmethylmethylene, hexa-fluoroisopropylidene, phthalines, phthalimides, N-substituted phthalimides (methyl, phenyl), 1,4 phenylene, 1,4 naphthalene, 2,6 naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester and amide $R_2$ represents groups=1,4 benzene, 1,3 benzene, 4,4 biphenyl, p-terphenyl, m-terphenyl, 1,4 naphthalene, 2,6 naphthalene and compounds having the structure as shown in formula (5) wherein Y represents groups=isopropylidene, methylene, hexafluoroisopropylidene, ethylmethylene, isobutylmethylmethylene, diphenylmethylene, phenytmethylmethylene, phthalines, phthalimides, N-substituted phthalimides (phenyl,methyl), dihydroanthracene, indanes, spirobisindanes, thiophenes, azo, dimethyldiphenylsilane, tetraphenylsilane, hydroquinoids, cyclohexane, sulfide, sulfone, sulfoxide, ketone, ester and amide and X represents substituents on aromatic ring which consist of a straight chain of 1–6 carbon atoms or alkyl group consisting of branching or a phenyl group or a halogen atom and n is an integer from 1 to 4, which comprises copolymerisation of the monomer of the formula (2) with dimethylesters of dicarboxylic acids of the formula (7) where $R_1$, $R_2$ X & n have the meaning given above by heating at a temperature in the range of 25° to 350° C., a pressure in the range of 760 mm Hg to 0.1 mmHg in an inert atmosphere in the presence of a metal organic compound catalyst. The catalyst can be chosen from amongst the wide variety of metal organic compounds known. Examples are titanium isopropoxide, titanium -n-butoxide and titanium aryloxide. In case of titanium aryloxide the aryl group may have a substituent (Cl,Br, $NO_2$, $OCH_3$, $CH_3$, (o,m,p) or unsubstituted. Derivatives of tin compounds such as di-n-butyltin oxide, di-n-butyltin dicarboxylates, di-n-butyltin diacetate, dibutyltin-dilaurate, di-n-butyltin dimethoxide, tri-n-butyltin hydroxide, n-tetrabutyltin, tinoxalate, tri-n-butyltin halide (Cl, Br), di-n-butyltin dihalide(Cl,Br) and stannoxanes having general formula $(XR_1 R_2)_2$ where $R_1 R_2$=alkyl, aryl, substituted aryl (Cl, Br, —$OCH_3$, $CH_3$,—CN, $NO_2$) (o,m & p) and X=O-alkyl, O-aryl, acetate, phenate, and halogens (Cl, Br), for a period in the range of 3 to 7 hours.

The relative composition of the poly(arylester-carbonate)s in terms of the ester to carbonate linkage can be varied between 0.67–0.99 moles by suitably adjusting the mole ratios of monomers of the formulae (7) and (2) in the above reaction.

The structure of the poly(arylester-carbonate)s of the formula (1) produced having a=0.33–0.01 moles and b=0.67–0.99 moles, herein is characterised by two carbonyl bands in the infra red spectrum, one string band due to ester linkage at 1735 $cm^{-1}$ to 1745 $cm^{-1}$ and the other weak band due to the carbonate linkage at 1770 $cm^{-1}$ to 1780 $cm^{-1}$. The inherent viscosity of the polymer is around 0.26–0.67 dL/g. Depending on the nature of $R_1$ and $R_2$ group, the polymers show a range of crystallinities around 30%. The glass transition temperature of poly(arylester-carbonate)s varies from 170°–200° C.

The main advantages of the invention are:

Unlike hitherto known processes, the present invention uses only one monomer for the synthesis of poly(arylester-carbonate)s. Thus the problems associated with controlling the relative stoichiometry of the three monomers are eliminated. The process disclosed herein uses inexpensive raw materials, no toxic chemicals and avoids the use of volatile organic solvents.

The invention is illustrated by the examples given below which should not be construed to limit the scope of the invention.

EXAMPLES

Example 1

An ester-carbonate monomer derived from monomethylcarbonate bisphenol-A and terephthaloyl chloride (450 mg, $6.4 \times 10^{-4}$ mole) and titanium isopropoxide (1.59 mg, $6.41 \times 10^{-6}$ mole) were introduced into a glass tube under nitrogen atmosphere and heated to 200° C. for 60 min. Thereafter the tube was evacuated to 0.1 mmHg and held at 200° C. for 60 min. Further reaction was carried out for 60 min. each at 250° C. and 280° C. and for 30 min. at 320° C. The pale brown colour polymer obtained was cooled to room temperature and dissolved in phenol- 1,1,2,2, tetrachloroethane 60/40 W/W) solvent mixture. The polymer was precipitated in methanol and dried under vacuum. The yield of the polymer was 320 mg (82%). It had an η inherent of 0.57 dL/g at 30° C. in phenol-1,1,2,2 tetrachloroethane solvent mixture.

Example 2

An ester-carbonate monomer derived from monomethylcarbonate bisphenol-A and terephthaloyl chloride (450 mg, $6.41 \times 10^{-4}$ mole) and 1,3 diphenoxytetrabutyldistannoxane (8.56 mg, $6.41 \times 10^{-6}$ mole) were introduced into a glass tube under nitrogen atmosphere and was heated to 200° C. for 60 min. Thereafter the tube was evacuated to 0.1 mmHg and at 200° C. for 60 min. Further reaction was carried out for 60 min. each at 250° C. and 280° C. The pale brown colour polymer obtained was cooled to room temperature and dissolved in phenol-1,1,2,2 tetrachloroethane (60/40 W/W) solvent mixture The polymer was precipitated in methanol and dried under vacuum. The yield of the polymer was 330 mg (84%). It had an η inherent 0.5 dL/g at 30° C. in phenol-1,1,2,2 tetrachloroethane solvent mixture.

Example 3

An ester-carbonate monomer derived from monomethylcarbonate bisphenol-A and isophthaloyl chloride (300 mg, $4.27 \times 10^{-4}$ mole) and titanium isopropoxide (1.06 mg, $4.27 \times 10^{-6}$ mole) were introduced into a glass tube under nitrogen atmosphere and heated to 150° C. for 60 min. Thereafter the tube was evacuated to 0.1 mm Hg and held at 150° C. for 30 min. Further reaction was carried out for 60 min. each at 200° C., 250° C. and 280° C. and for 30 min at 300° C. The pale brown colour polymer obtained was cooled to room temperature and dissolved in chloroform. The polymer was precipitated in methanol. The yield of the polymer obtained was 214 mg (84%). It had an η inherent of 0.38 dL/g at 30° C. in chloroform.

Example 4

An ester-carbonate monomer derived from monomethylcarbonate bisphenol-A and 2,6 naphthalene dicarbonylchloride (200 mg, 2.65×10$^{-4}$ mole) and titanium isopropoxide (0.756 mg, 6.41×10$^{-6}$ mole) were introduced into a glass tube under nitrogen atmosphere and heated to 220° C. for 60 min. Thereafter the tube was evacuated to 0.1 mm Hg and held at 220° C. for 60 min. Further reaction was carried out for 60 min. at 280° C. and for 30 min. at 320° C. The pale brown colour polymer obtained was cooled to room temperature and dissolved in phenol-1,1,2,2, tetrachloroethane (60/40 W/W) solvent mixture The polymer was precipitated in methanol and dried under vacuum. The yield of the polymer was 140 mg (80%). It had an η inherent of 0.49 dL/g at 30° C. in phenol-1,1,2,2 tetrachloroethane solvent mixture.

Example 5

An ester-carbonate monomer derived from monomethylcarbonate bisphenol-A and his (4-chloro carbonylphenyl)diphenyl silane (250 mg, 2.6×10$^{-4}$ mole) and titanium isopropoxide (0.65 mg, 2.6×10$^{-6}$ mole) were introduced into a glass tube under nitrogen atmosphere and heated to 100° C. The temperature was increased from 100° C. to 200° C. in 30 min. and held at 200° C. for 30 min. Thereafter the tube was evacuated to 0.1 mm Hg and reaction was carried out for 60 min. each at 200° C., 250° C. and 280° C. and for 30 min. at 320° C. The pale brown colour polymer obtained was cooled to room temperature and dissolved in chloroform solvent. The polymer was precipitated in methanol and dried under vacuum. The yield of the polymer was 185 mg (82%). It had an η inherent of 0.34 dL/g at 30° C. in chloroform.

Example 6

An ester-carbonate monomer derived from monomethylcarbonate bisphenol-A and bis (4-chloro carbonyl phenyl) dimethyl silane (250 mg, 3×10$^{-4}$ mole) and titanium isopropoxide (0.74 mg, 3×10$^{-6}$ mole) were introduced into a glass tube under nitrogen and heated to 100° C. The temperature was raised from 100° C.–200° C. in 30 min and held at 200° C. for 30 min. Thereafter the tube was evacuated to 0.1 mm Hg and reaction was carried out for 60 min. each at 200° C. 250° C. and 280° C. and for 30 min at 320° C. The pale brown colour polymer obtained was cooled to room temperature and dissolved in chloroform solvent. The polymer was precipitated in methanol and dried under vacuum. The yield of the polymer was 191 mg (86%). It had an η inherent of 0.3 dL/g at 30° C. in chloroform.

Example 7

An ester-carbonate monomer derived from monomethylcarbonate bisphenol-A and isophthaloyl chloride (200 mg, 2.48×10$^{-4}$ mole), bisphenol-A bis-methylcarbonate (490 mg, 1.42×10$^{-3}$ mole) in a ratio of 1:5 moles and titanium isopropoxide (3.53 mg, 1.42×10$^{-5}$ mole) were introduced into a glass tube under nitrogen atmosphere and was heated to 150° C. for 30 min. The temperature was increased to 200° C. and held for 60 min. Thereafter the tube was evacuated to 0.1 mmHg and reaction was carried out for 60 min each at 200° C., 250° C. and 280° C. and for 30 min. at 300° C.

The pale brown colour polymer obtained was cooled to room temperature and dissolved in chloroform. The polymer was precipitated in methanol and dried under vacuum. The yield of the polymer was 465 mg (91%). It had an η inherent of 0.2 dL/g at 30° C. in chloroform.

Example 8

An ester-carbonate monomer derived from monomethylcarbonate bisphenol-A and isophthaloyl chloride (200 mg, 2.48×10$^{-4}$ mole), bisphenol-A bis-methylcarbonate (290 mg, 8.54×10$^{-4}$ mole) in a ratio of 1:3 moles and titanium isopropoxide (2.42 mg, 8.54×10$^{-6}$ mole) were introduced into a glass tube under nitrogen atmosphere and was heated to 150° C. for 30 min. The temperature was increased to 200° C. and held for 60 min. Thereafter the tube was evacuated to 0.1 mmHg and reaction was carried out for 60 min. each at 200° C., 250° C. and 280° C. and for 30 min. at 320° C. The pale brown colour polymer obtained was cooled to room temperature and dissolved in chloroform. The polymer was precipitated in methanol and dried under vacuum. The yield of the polymer was 320 mg (82%). It had an η inherent of 0.23 dL/g at 30° C. in chloroform.

Example 9

An ester-carbonate monomer derived from monomethylcarbonate bisphenol-A and terephthaloyl chloride (200 mg, 2.48×10$^{-4}$ mole), bisphenol-A bis-methylcarbonate (290 mg, 8.54×10$^{-4}$ mole) in a ratio of 1:3 moles and titanium isopropoxide (2.42 mg, 8.54×10$^{-6}$ mole) were introduced into a glass tube under nitrogen atmosphere and was heated to 150° C. for 30 min. The temperature was increased to 200° C. and held for 60 min. Thereafter the tube was evacuated to 0.1 mmHg and reaction was carried out for 60 min each at 200° C., 250° C. and 280° C. and for 30 min. at 320° C. The pale brown colour polymer obtained was cooled to room temperature and dissolved in phenol-1,1,2,2 tetrachloroethane (60/40 W/W). The polymer was precipitated in methanol and dried under vacuum. The yield of the polymer was 320 mg (82%). It had an η inherent of 0.37 dL/g at 30° C. in phenol-1,1,2,2 tetrachloroethane (60/40 W/W) solvent mixture.

Example 10

An ester-carbonate monomer derived from monomethylcarbonate bisphenol-A and terephthaloyl chloride (200 mg, 2.84×10$^{-4}$ mole), dimethyl terephthalate (15.21 mg, 7.83×10$^{-5}$ mole) in a ratio of 1:0.27 moles and titanium isopropoxide (0.8 mg, 2.84×10$^{-6}$ mole) were introduced into a glass tube under nitrogen atmosphere and heated from 25° C. to 200° C. in 30 min. and was held for 60 min. The tube was evacuated to 0.1 mm Hg and reaction was carried out for 60 min each at 200° C., 250° C. and 280° C. and for 30 min at 320 ° C. During polymerization some part of the dimethyl terephthalate was sublimed and was deposited on the inner side of glass tube. The pale brown colour polymer obtained was cooled to room temperature and dissolved in phenoltetrachloroethane (60\40 W\W) solvent mixture. The polymer was precipitated in methanol and dried under vacuum. The yield of the polymer was 133 mg (73%). It had an η inherent of 0.48 dL/g at 30° C. in phenol-1,1,2,2 tetrachloroethane (60\40 W\W) solvent mixture.

Example 11

An ester-carbonate monomer derived from monomethylcarbonate bisphenol-A and terephthaloyl chloride (200 mg, 2.84×10$^{-4}$ mole), dimethyl terephthalate (30.42 mg, 1.56×10$^{-4}$ mole) in a ratio of 1:0.54 moles and titanium isopropoxide (0.8 mg, 2.84×10$^{-6}$ mole) were introduced into a glass tube under nitrogen atmosphere and heated from 25° C. to 200° C. in 30 min. and was held for 60 min. The tube was evacuated to 0.1 mmHg and reaction was carried out for 60 min each at 200° C., 250° C. and 280° C. and for 30 min at 320 ° C. During polymerization some part of the dimethyl terephthalate was sublimed and was deposited on the inner side of glass tube. The pale brown colour polymer obtained was cooled to room temperature and dissolved in phenol-tetrachloroethane (60\40 W\W) solvent mixture. The polymer was precipitated in methanol and dried under vacuum. The yield of the polymer was 142 mg (74%). It had an η inherent of 0.35 dL/g at 30° C. in phenol-1,1,2,2 tetrachloroethane (60\40 W\W) solvent mixture.

Example 12

An ester-carbonate monomer derived from monomethylcarbonate bisphenol-A and terephthaloyl chloride 200 mg, $2.84 \times 10^{-4}$ mole), dimethyl terephthalate (45.6 mg, $2.35 \times 10^{-4}$ mole) in a ratio of 1:0.82 moles and titanium isopropoxide (0.8 mg, $2.84 \times 10^{-6}$ mole) were introduced into a glass tube under nitrogen atmosphere and heated from 25° C. to 200° C. in 30 min. and was held for 60 min. The tube was evacuated to 0.1 mm Hg and reaction was carried out for 60 min each at 200° C., 250° C. and 280° C. and for 30 min at 320 ° C. During polymerization some part of the dimethyl terephthalate was sublimed and was deposited on the inner side of glass tube. The pale brown colour, polymer obtained was cooled to room temperature and dissolved in phenol-tetrachloroethane (60\40 W\W) solvent mixture. The polymer was precipitated in methanol and dried under vacuum. The yield of the polymer was 148 mg (72%). It had an η inherent of 0.26 dL/g at 30° C. in phenol-1,1,2,2 tetrachloroethane (60\40 W\W) solvent mixture.

Example 13

An ester-carbonate monomer derived from monomethylcarbonate bisphenol-A and terephthaloyl chloride 200 mg, $2.84 \times 10^{-4}$ mole), dimethyl terephthalate (45.6 mg, $2.35 \times 10^{-4}$ mole) in a ratio of 1:0.82 moles and titanium isopropoxide (0.8 mg, $2.84 \times 10^{-6}$ mole) were introduced into a glass tube under nitrogen atmosphere and heated from 25° C. to 200 ° C. in 30 min. and was held for 60 min. The tube was evacuated to 0.1 mmHg and reaction was carried out for 60 min each at 200° C., 250° C. and 280° C. and for 60 min at 320 ° C. During polymerization some part of the dimethyl terephthalate was sublimed and was deposited on the inner side of glass tube. The pale brown colour polymer obtained was cooled to room temperature and dissolved in phenol-tetrachloroethane (60\40 W\W) solvent mixture. The polymer was precipitated in methanol and dried under vacuum. The yield of the polymer was 146 mg (72%). It had an η inherent of 0.35 dL/g at 30° C. in phenol-1,1,2,2 tetrachloroethane (60\40 W\W) solvent mixture.

Example 14

An ester-carbonate monomer derived from monomethylcarbonate bisphenol-A and terephthaloyl chloride (400 mg, $5.69 \times 10^{-4}$ mole), dimethyl isophthalate (83 mg, $5.07 \times 10^{-4}$ mole) in a ratio of 1:0.75 moles and titanium isopropoxide (1.41 mg, $5.69 \times 10^{-6}$ mole) were introduced into a glass tube under nitrogen atmosphere and heated to 80° C. and was held for 30 min. The temperature was increased from 60° C.–150° C.–200° C. in 60 min. The tube was evacuated to 0.1 mmHg and reaction was carried out for 60 min each at 200° C., 250° C. and 280° C. and for 30 min at 320 ° C. During polymerization some part of the dimethyl isophthalate was sublimed and was deposited on the inner side of glass tube. The pale brown colour polymer obtained was cooled to room temperature and dissolved in chloroform chloroform soluble polymer precipitated in methanol and dried under vacuum. The yield of the polymer was 200 mg (53%). It had an η inherent of 0.67 dL/g at 30° C. in chloroform solvent. The yield of the chloroform insoluble polymer was 35 mg (20%) which was soluble in phenol-1, 1,2,2 tetrachloroethane(60\40 W\W) solvent mixture.

We claim:

1. A novel poly(arylester-carbonate)s of the formula,

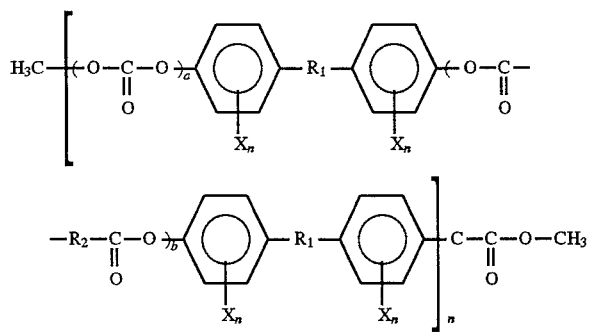

where a=0.33 and b=0.67 moles, $R_1$ isopropylidene, methylene, ethylmethylene, phenylmethylene, hexafluoroisopropylidene, phthalines, phthalimides, N-substituted phthalimides (methyl, phenyl), 1,4-phenylene, 1,4-naphthalene, 2,6-naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester, and amide, $R_2$ represents 1,4-benzene, 1,3-benzene, 4,4-biphenyl, p-terphenyl, m-terphenyl, 1,4-naphthalene, 2,6-naphthalene, and compounds having the structure

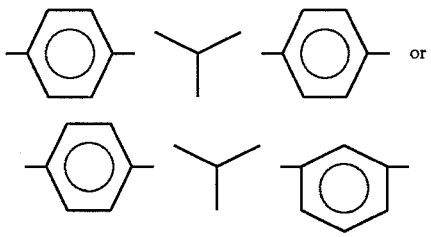

wherein Y represents isopropylidene, methylene, hexafluoroisopropylidene, ethylmethylene, isobutylmethylmethylene, diphenylmethylene, phenylmethylmethylene, phthalines, phthalimides, N-substituted phthalimides (phenyl, methyl), dihydroanthracene, indanes, spirobisindanes, thiophenes, azo, dimethyldiphenylsilane, tetraphenylsilane, hydroquinoids, cyclohexane, sulfide, sulfone, sulfoxide, ketone, ester, and amide and X represents substituents on aromatic ring which consist of a straight chain of carbon atoms or an alkyl group consisting of branching chain or a phenyl group or a halogen atom and n is an integer from 1 to 4.

2. A process for the preparation of poly(arylester-carbonate)s of the formula,

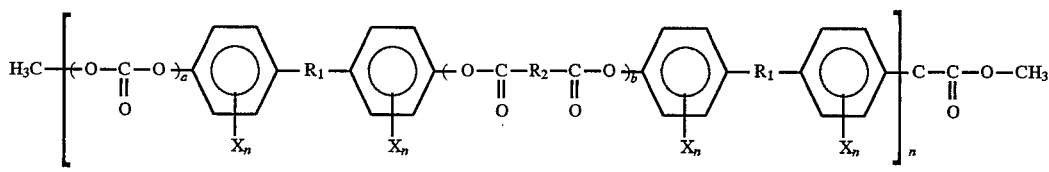

where a=0.33 and b=0.67 moles, $R_1$ represents groups such as isopropylidene, methylene, ethylmethylene, phenylmethylene, hexafluoroisopropylidene, phthalines, phthalimides, N-substituted phthalimides (methyl, phenyl), 1,4-phenylene, 1,4-naphthalene, 2,6-naphthalene, dihydroanthracene, spirobisindanes, indanes, thiophenes, azo, dimethyldiphenylsilane, tetraphenylsilane, siloxane, hydroquinoids, cyclopentane, cyclohexane, ether, sulfide, sulfoxide, ketone, ester, and amide, $R_2$ represents 1,4-benzene, 1,3-benzene 4,4- biphenyl, p-terphenyl, m-terphenyl, 1,4-naphthalene, 2,6- naphthalene, and compounds having the structure

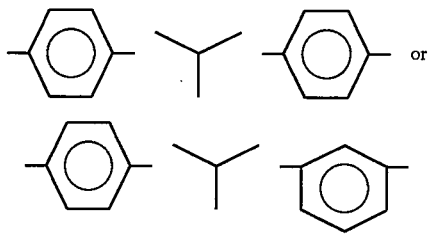 or wherein Y represents groups such as isopropylidene, methylene, hexafluoroisopropylidene, ethylmethylene, isobutylmethylmethylene, diphenylmethylene, phenylmethylmethylene, phthalines, phthalimides, N-substituted phthalimides (phenyl, methyl), dihydroanthracene, indanes, spirobisindanes, thiophenes, azo, dimethyldiphenylsilane, tetraphenylsilane, hydroquinoids, cyclohexane, sulfide, sulfone, sulfoxide, ketone, ester, and amide and X represents substituents on aromatic ring which consist of a straight chain of carbon atoms or an alkyl group consisting of a branching chain or a phenyl group or a halogen atom and n is an integer from 1 to 4, which comprises polymerization of the monomer of the formula where $R_1$, $R_2$ $X_n$ are as described previously comprising heating at a temperature in the range of 80° to 850° C., at a pressure in the range of 760 mm Hg to 0.1 mm Hg in an inert atmosphere in the presence of a metal organic compound catalyst, for a period in the range of 3 to 7 hours.

3. The process as claimed in claim 2 wherein the catalyst is selected from the group consisting of titanium isopropoxide, titanium-n-butoxide and titanium aryl oxide.

4. The process as claimed in claim 2 wherein the amount of catalyst used ranges $10^{-2}$ to $10^{-5}$ mole per mole of the monomer.

5. The process as claimed in claim 2 wherein the inert atmosphere is maintained by using inert gases selected from the group consisting of nitrogen, argon, and helium.

\* \* \* \* \*